Patented June 25, 1940

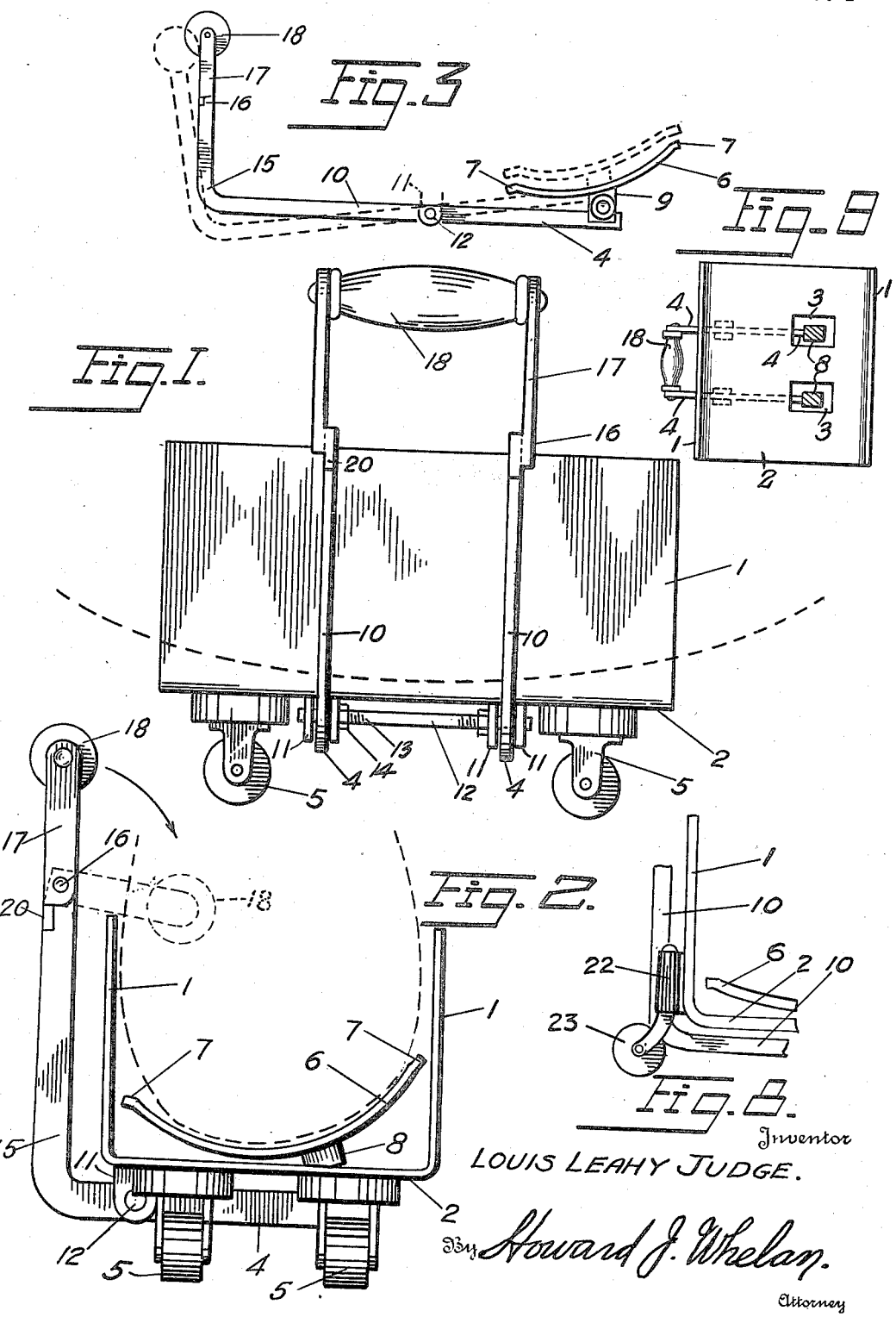

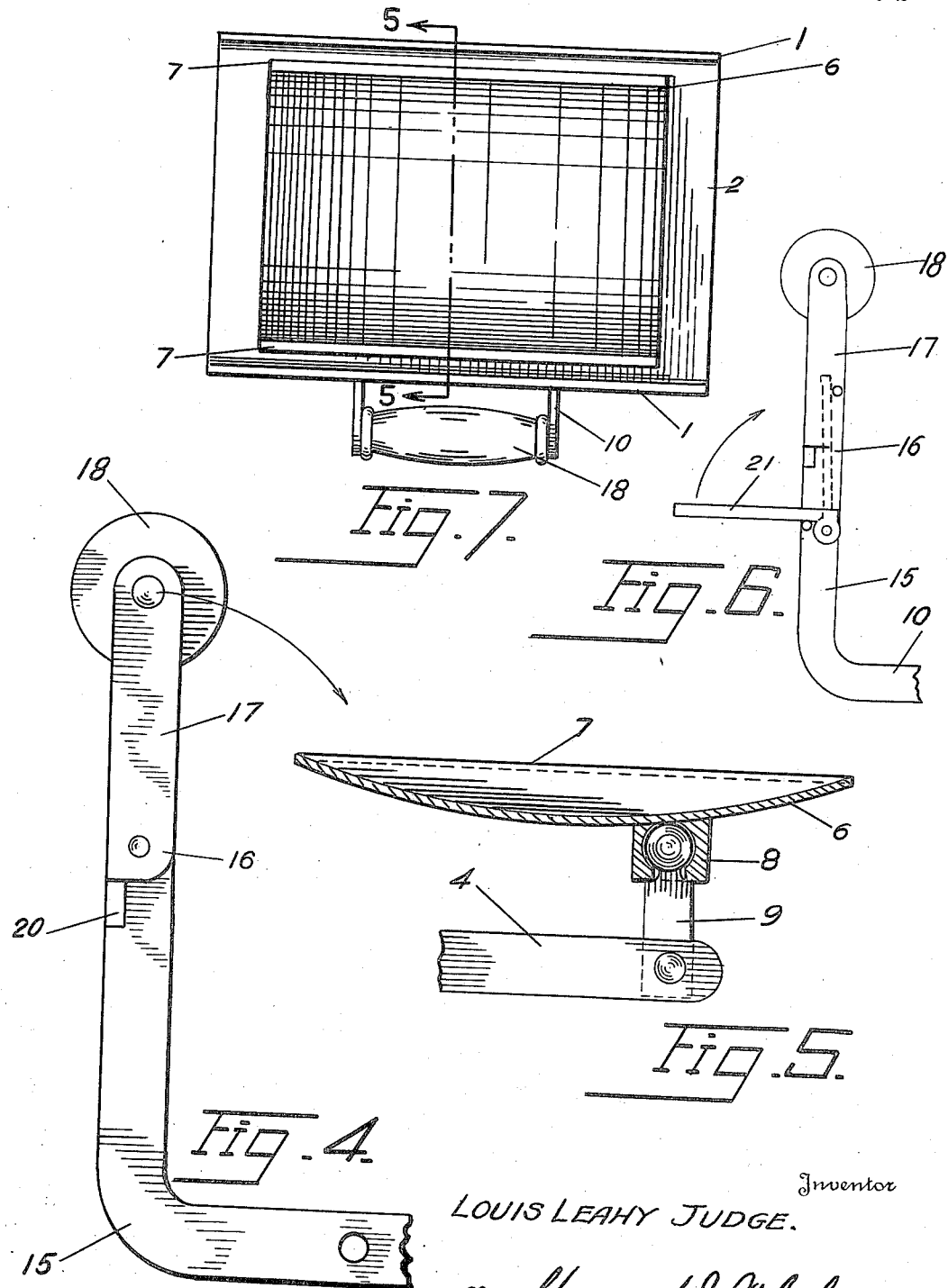

2,205,746

UNITED STATES PATENT OFFICE 2,205,746

AUTOMOBILE TIRE JACK OR DOLLY

Louis Leahy Judge, Baltimore, Md.

Application July 3, 1939, Serial No. 282,748

4 Claims. (Cl. 254—8)

This invention refers to vehicles and more particularly to a device for handling tires that they may be mounted or removed with facility.

This invention has the following objects:

To provide a device that can carry automobile tires and spare wheels and support same in a position for the placing of same on the rim or hub, as the case may be, with ease.

To have the device designed to require a relatively small amount of tedious effort when being used for its intended purpose.

To have the arrangements such that tires or spare wheels may be carried from one location to another on same and not need lifting by hand while doing so.

Another object is to have a device applicable for these uses that will lessen the soiling of the user's hands and person.

A further object is to provide a method of manipulating tires for installation on a vehicle that will eliminate the usual incidental dangers and inconveniences.

Still another object is to have the device of a conveniently small size and form that it may be carried around in the vehicle as another accessory tool.

And other objects that will become apparent as the invention is more fully described.

With the increase in size and weight of tires and spare wheels, the question of installing and removing same becomes a matter of considerable danger and inconvenience. No device has been provided that will meet the requirements of portable use, for ordinary automobile users. Such mechanism that has been provided involves the use of a heavy and cumbersome implement, suitable for garage or stationary use, and cannot be placed in the tool compartment of the vehicle. This invention provides for a tool that may be carried around by the user and easily handled and carried by him. It is convenient in handling and in raising the wheel onto the rim or hub of the automobile. It consists of a carriage with a manipulation plate that will take and carry the tire or spare wheel and allow same to be varied in position thereon to permit the adjustment required to align the holding bolts with the holes that are intended to receive them. It has a handle that folds out of the way, and the general construction is compact and light. The tire or wheel is raised or lowered to suit, by hand, and without requiring much room away from the wheel, that might interfere with traffic and surrounding objects. In fact, it fits close to the wheel and allows the user to manipulate the spare wheel or tire with convenience and assurance that it will be aligned promptly, and by a person of common physcial endurance.

In the drawings, which illustrate an example of this invention:

Figure 1 is a view in elevation of a wheel manipulator carriage embodying this invention, Figure 2 is a side elevation of Figure 1;

Figure 3 is a diagrammatic detail of the operating mechanism used in the manipulator;

Figure 4 is a detail of the handle construction of the device;

Figure 5 is a sectional detail of the tire pan used for supporting the tire in the manipulator or carriage, taken on line 5—5 of Figure 7;

Figure 6 is a detail indicating the use of a knee plate on the device, and

Figure 7 is a plan view of Figure 1.

Figure 8 is a detail of the carriage with parts broken away, showing the use of side wall supported wheels.

Figure 9 is a plan view of the carriage with the manipulator plate removed to show the holes in the bottom plate for the manipulator mechanism to operate in.

Similar reference characters refer to similar parts throughout the drawings.

In the drawings, which indicate an embodiment of this invention, 1 represents the side walls of a manipulator carriage, which is preferably formed in a U-like shape, with its bottom plate indicated at 2. This bottom plate is flat and provided with holes 3 for the manipulator mechanism 4 to extend through, in a manner to be described. The bottom plate 2 has swivel wheel units 5 mounted beneath it which allow the carriage to be readily moved in different directions. The wheel units are preferably like castors, ball bearinged and otherwise arranged for facile turning and rotation in any direction. The carriage is made large enough to take the portion of the tire that is adjacent to the ground level without extending beyond the tire more than a limited distance. The sidewise construction is also brought within narrow limits of the width of the tire, so it will not project out too much from the side of the car, vehicle, or automobile.

The lifting mechanism consists of a manipulator plate 6, dished out and curved, and made with a slightly resilient flexibility, to enable it to adjust itself to variably sized tires and yet properly support same. This plate is preferably formed as indicated and has the flanges 7 extending from the sides to contact the walls 1 when the weight of the wheels or tires presses same out, beyond normal limits. The manipulator plate is mounted on bosses 8, which are arranged below same, and provide attachments 9 for the levers 10. The attachments extend through the holes or openings 3 in the bottom plate 2 and travel in a reciprocating manner through them.

The levers are fulcrumed on the bearings 11 and cross-shaft 12, attached to the bottom plate 2, and enable same to oscillate sufficiently to raise and lower the manipulator plate. The connection of the attachments with the manipulator plate is made offset so that the latter is normally supported at a slight angular tilt. The feature permits the tire to be raised and manipulated easily when it is removed or assembled. This will be more fully outlined in the operation. The use of the cross-shaft and the screw-threaded machining 13 and nuts 14, allows the levers 10 to be adjusted in position on the carriage.

The levers 10 are bent around as shown at 15, to bring them around close to the carriage and to the top line of the walls 1. The bent portions 15 are provided with connections 17 that permit handle bars 16 to move or rotate forward into the carriage interior out of the way, when not in use. The backward movement, however, of the handle bars is prevented by the catch or lug 29 on the levers so that the pulling backwards of the handle 18 with the handle bars attached, will operate the levers and in turn, operate the manipulating plate.

In the operation of the contrivance, the automobile wheel is raised off the ground through the use of the conventional jack. This manipulator carriage is then moved in under the tire. The bolts holding the wheel are released and when the tire is about ready for removal, the operator pulls on the handle 18, and through the levers 10, brings the manipulator plate 6 into contact with the tire. The leverage pressure is increased by pulling harder on the handle 18, and the wheel is lifted through the use of one hand of the operator, while the other hand holds the upper portion of the same, and with a slight movement of the carriage outwardly, the wheel is removed. In its removal, the falling of the tire is prevented, the dished out plate serving to hold it up. Should the wheel slip or tip over too much, it would come into contact with the walls of the carriage. The installing of the wheels is the reverse to the above. The wheel is brought close to the holding bolt holes, and raised or lowered, or moved forward or backward, until the bolts can be placed in readily. The use of one hand on the contrivance provides all necessary manipulation for positioning the wheel properly, and leaves the other hand free for placing the bolts in and slight movements of the wheel incidental. The weight of the wheel is not directly supported by the hands and arms of the user, as required in the conventional method, and the dangers of mashing fingers, limbs, straining the muscles of the arms and back, are avoided, and the time of placing the bolts is considerably reduced. The actual placing of the wheels on the vehicle is made a definite process, requiring the individual steps to be done singly, and no physical strains are put on the user. In other methods, the strains on the physique of the user are considerable and may cause serious injury, while the operation, because of its uncertainty and difficulty may require many tries and much time, with the possibility of causing injury to the hands or other parts of the body of the operator. The contrivance takes the hard parts out of the process of installing and removing tire wheels.

In the construction shown in Figure 6, arrangements are provided for manipulation by the knee or foot. This is done, using a member 21, attached and hinged to the mechanism and adapted to be raised or lowered in and out of position for enabling the user to place his knee on the device and operate it, his hands free for use on the tire or other parts. The operation of the device is similar to that already described, but provides the additional feature for the user, without interfering with the other general construction. It may or may not be included in the original form indicated in Figure 1, as it does not modify the preferred construction of the contrivance sufficiently to change the form of existing parts.

In Figure 8 is shown a modified form of swivel wheel for the carriage, which is attached to the side of the carriage in order to raise the wheel as high as possible, and thereby permit the carriage to come as close to the ground as possible. The mechanism, when underneath, is the limiting item in this case, to prevent the carriage resting on the ground. The wheel is indicated at 23 and the holder 22 attaches it to the side of the carriage. The other portions of the device remain as described heretofore. This lowering feature is quite important for use with automobiles having fenders or mudguards that almost completely encase the tires, as the room for operating is very restricted and the metal work tends to interfere with the removal and installing of the tires or spare wheels. This device enables the spare wheel to be moved around and manipulated even in these restricted conditions.

While but one form of the invention is indicated in the drawings, it is not desired to limit this application for patent, otherwise than is necessary, as it is appreciated that other constructions could be made that would employ the same principles and come within the scope of the appended claims.

Having thus described the invention, what is claimed is:

1. A manipulating carriage for handling wheels for vehicles comprising in combination, a U-shaped carriage having openings therein in the bottom plate thereof; a manipulating plate having a flexible curved form for engaging the surface of a wheel tire adjustably; a lever mechanism attached to the manipulating plate through said openings and adapted to hold same in a tilting position, and handle means attached to the said mechanism for actuating the same and causing the manipulating plate to rise and lower in the carriage at an angle to the carriage, said means being so linked that it will fold into the carriage when not in operation, and swivel wheels for carrying the carriage.

2. A manipulating carriage of the class described comprising in combination, a carriage with openings in the bottom plate thereof; a manipulating plate positioned angularly in the carriage and adapted to engage and support the external surface of a tire; a mechanism attached to the manipulating plate for moving the same and raising and lowering tires placed therein in a predetermined manner, and with portions actuating through said openings, and a handle attached to the mechanism for operating the mechanism from the side of the carriage.

3. A device of the class described comprising, a carriage having side walls, a manipulator plate mounted on the carriage and adapted to cooperate with the walls in holding and supporting a tire for manipulation, a plural lever mechanism operating on the carriage and flexibly attached to the said plate, and means for controlling the operation of the mechanism and enabling the tire to be raised independently of the hands of the user operating the device and a spade handle member connecting the plural lever mechanism into one control and disposed to one side of the carriage substantially parallel to the plate.

4. A manipulator for tire mounting or removal comprising in combination, a carriage, a plate connected to the carriage, an exterior mechanism disposed under the carriage and extending transversely across same to portions of the plate spaced on both sides of its transverse center line for moving same in a predetermined manner and the tire thereon with it, a connecting handle means attached to the mechanism exterior to the carriage and at one side thereof and substantially horizontal and above the plane of the said plate for actuating the mechanism in a controllable manner and without extending from the carriage an appreciable amount during its actuation, and a swivel joint on the plate to enable the tire and plate to be adjusted in position.

LOUIS LEAHY JUDGE.